United States Patent

Däfler et al.

[11] Patent Number: 5,806,395
[45] Date of Patent: Sep. 15, 1998

[54] METHOD AND APPARATUS FOR REMOVING AN EDGE FIN FROM METAL RIM REINFORCING STRIPS

[75] Inventors: Hans-Joachim Däfler, Erkrath; Ralf Duning, Solingen; Uwe Gohrbandt, Haan; Helmut Tümmler, Hilden, all of Germany

[73] Assignee: Mannesmann Aktiengesellschaft, Düsseldorf, Germany

[21] Appl. No.: 716,640

[22] Filed: Sep. 13, 1996

[30] Foreign Application Priority Data

Sep. 14, 1995 [DE] Germany ............. 195 35 574.1

[51] Int. Cl.⁶ .................................................. B23D 25/00
[52] U.S. Cl. ............................. 83/285; 83/331; 83/425.2; 83/449; 83/914
[58] Field of Search ............... 83/284, 285, 331, 83/425, 425.2, 438, 440, 448, 451, 452, 914

[56] References Cited

U.S. PATENT DOCUMENTS 3,377,896 4/1968 DeCorta ........................... 83/440
5,007,318 4/1991 Cox et al. ...................... 83/425.2

*Primary Examiner*—Maurina T. Rachuba
*Attorney, Agent, or Firm*—Cohen, Pontani, Lieberman & Pavane

[57] ABSTRACT

Method and apparatus for removing an edge fin produced on a workpiece surface during the production of metal rim reinforcement strips. The edge fin is removed after the rim is clamped in the longitudinal direction by cutting a lateral incision into the edge fin along the longitudinal direction just above the workpiece surface. The cutting tool may be stationary blades or roll blades, the latter blades cooperating with a support for the edge fin during lateral cutting.

6 Claims, 3 Drawing Sheets

METHOD AND APPARATUS FOR REMOVING AN EDGE FIN FROM METAL RIM REINFORCING STRIPS

BACKGROUND OF THE INVENTION

1. Field of the Invention

The invention relates to a method and apparatus for eliminating an edge fin created on a metal rim during resistance pressure welding, especially during the production of metal rim reinforcing strips.

2. Description of the Related Art

In the production of a workpiece such as a metal rim reinforcing strip, a metal sheet is typically bent into a length of pipe, with the confrontingly opposite ends of the bent metal sheet pressure welded to form a rim or cylinder. The pressure welding creates edge fins of varying sizes with the size of the edge fin depending on the type of welding employed, i.e., fin butt welding or pressure butt welding, and on the material, i.e., steel or light metal. In the case of pressure butt welding, the edge fin is particularly large, especially with respect to its radial extension, and the subsequent expense of eliminating the edge fin by machining is considerable. Until now, the edge fin was usually removed layer by layer by means of multiple planings. This method may cause the shavings from the planing to roll sharply and damage the workpiece surface. In most cases this is not acceptable, particularly for the surface that will eventually be the outside of the rim. Furthermore, the removal of the edge fin is done by hand, through grinding, and is very time consuming and expensive. In addition, removing an edge fin in this manner, i.e., by repeated hand-planing, may remove too much of the rim wall material, thereby weakening the wall.

SUMMARY OF THE INVENTION

It is accordingly an object of the present invention to provide a method for eliminating an edge fin from the inner and outer surfaces of a metal reinforcing rim without damaging to the rim surfaces proximate the edge fin.

It is a further object of this invention to provide a method for removing an edge fin from the inner and outer surfaces of a metal reinforcing rim without decreasing the rim wall thickness to such a degree that the rim wall is weakened.

A still further object of this invention is to provide a method for removing an edge fin from the inner and outer surfaces of a metal reinforcing rim which does not cause the material being removed to coil.

In contrast to the known planing method, the present invention makes a lateral incision into the edge fin just above the surrounding workpiece surface. This takes advantage of the fact that the edge fin has a relatively narrow stem at this location. Because of the lateral incision, shavings created during the removal process no longer coil up, and the damage to the surrounding workpiece surface caused by the known methods is thus avoided. The method can be improved even further if the lateral incision is carried out in a rolling-off manner, i.e. using rolling cutting blades, and against a resistance supporting the incision.

The apparatus used for the method according to the present invention is embodied as stationary blades or roll blades attached to tool carriers, which are moveable in the longitudinal direction of the edge fin. The tool carriers have clamping jaws which hold the rim securely in place and position the edge fin for incision by the stationary or roll blades. To facilitate the incision in the edge fin in the case of stationary blades, the cutting edge lying in the cutting direction is positioned at a slant relative to the longitudinal direction of the edge fin, and the cross-section vertical thereto is wedge-shaped. In the case of roll blades, the cutting edge lying in the cutting direction is also positioned at a slant relative to the longitudinal direction of the edge fin, and the cross-section vertical thereto is wedge-shaped. When using roll blades, the incision is supported by a blade-shaped nose facing the edge fin on the clamping side of the clamping jaws.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DESCRIPTION OF THE PRESENTLY PREFERRED EMBODIMENTS

Figure 1:
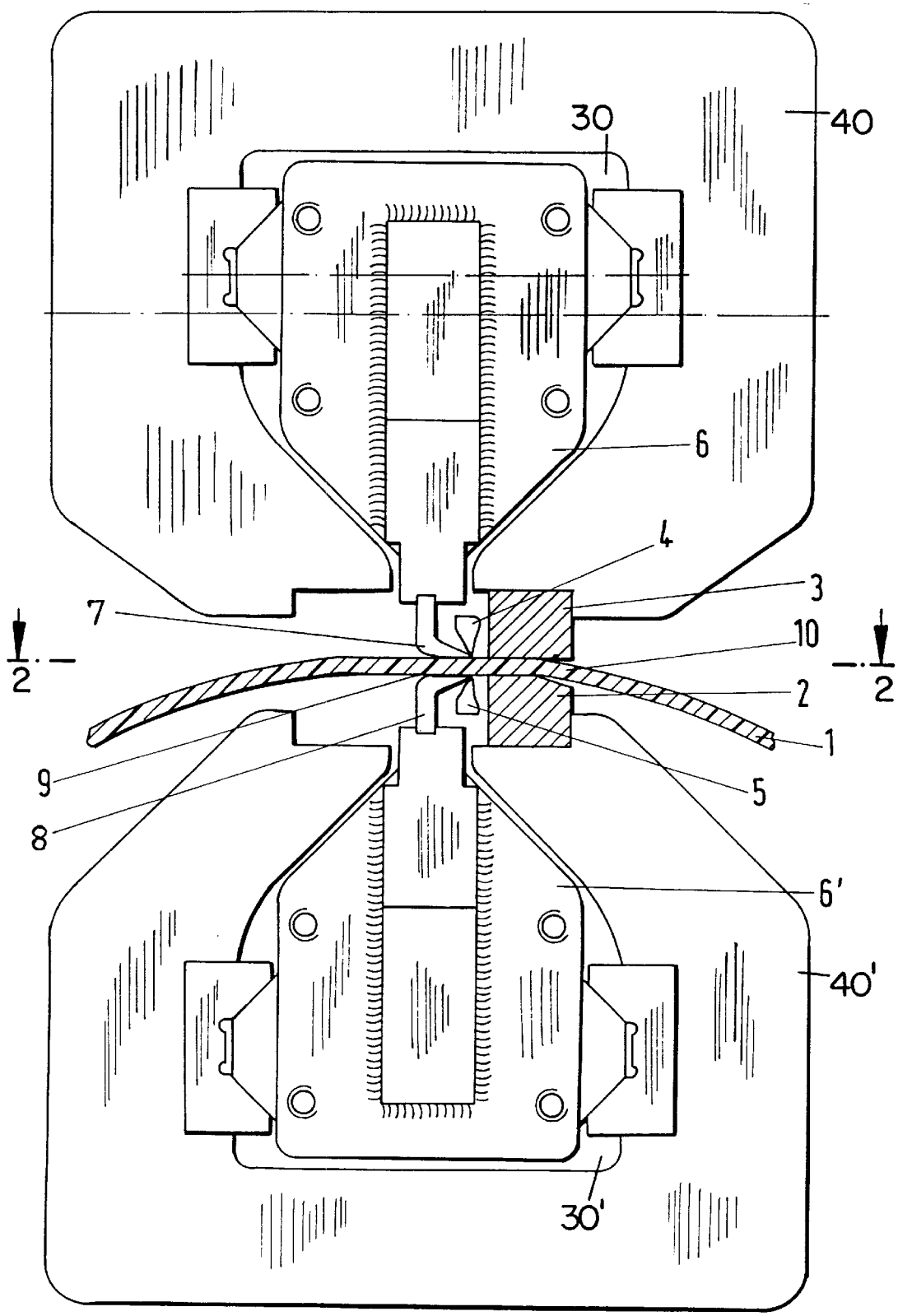
FIG. 1 is a partial cross-sectional view of an apparatus for eliminating an edge fin from a metal rim according to the present invention.
Figure 2:
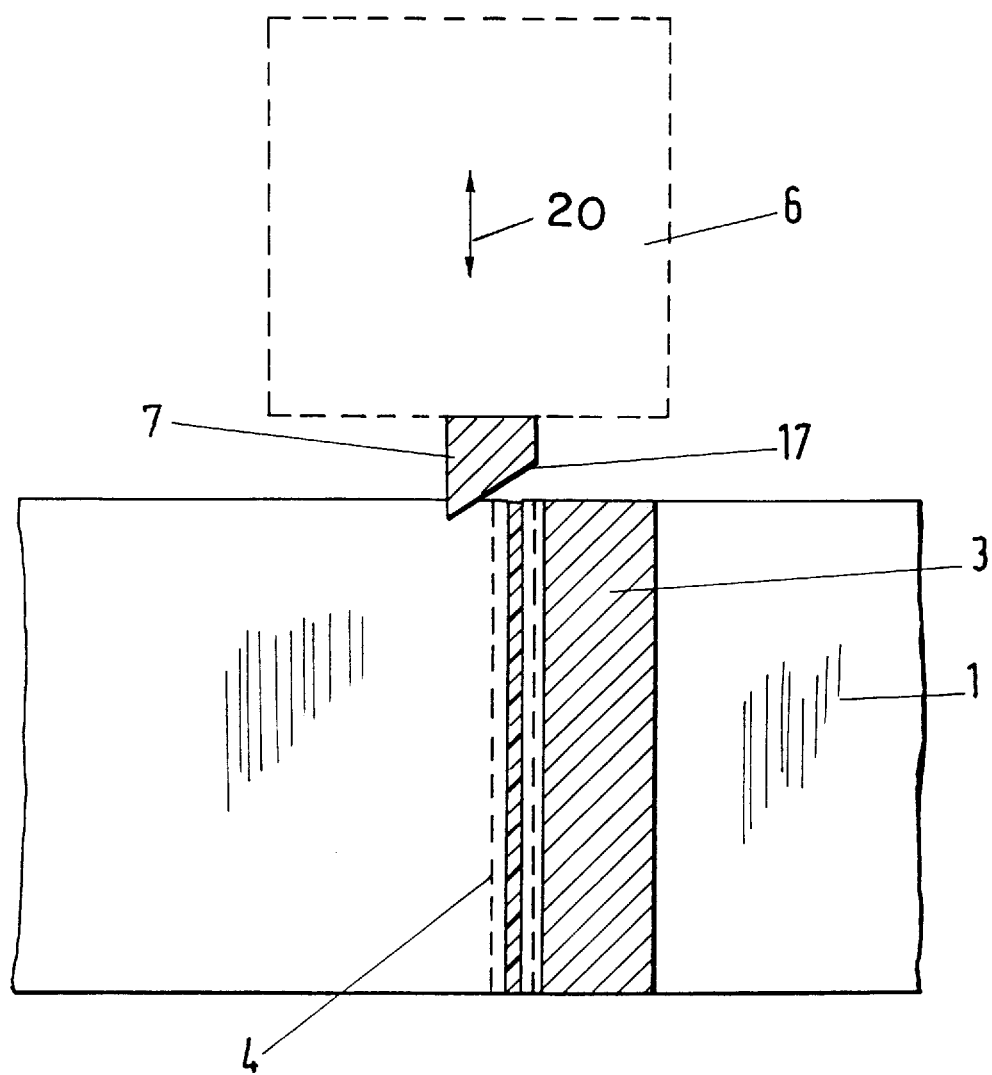
FIG. 2 is a cross-sectional view taken along the line A—A of FIG. 1.

Referring now to the drawings in detail, FIGS. 1 and 2 show a first embodiment of the apparatus of the present invention. The workpiece 1, here a part of a rim, is clamped between a pair of clamping jaws 2, 3 provided in frames 40, 40' having channels 30, 30' defined longitudinally therethrough. An edge fin 4, 5, which is created above and below the workpiece 1 during resistance pressure welding, is positioned near the clamping jaws 2,3. Blades 7, 8 are attached to tool carriers 6, 6', respectively. As shown in FIG. 2, the tool carriers 6, 6' are movable in a longitudinal cutting direction, as shown by arrow 20, for cutting the edge fin 4, 5. The blades 7, 8 have a cutting edge 17 and are designed in such a way that, when viewed in cross-section, they are wedge-shaped and the cutting edge 17, which lies in the longitudinal cutting direction, is slanted. Arranging the blades 7, 8 in this way facilitates making a lateral incision across the edge fin 4,5. As seen clearly in FIG. 1, blades 7, 8 are inserted just above the surrounding material surface 9, 10. Thus, the bulk of the edge fin 4,5 is removed by the blades 7,8. The remaining projection, i.e. what remains after making a lateral incision across the edge fin 4,5, can be planed away, for example, in a subsequent process. A smooth surface is always required on what will eventually be the outside of the rim, so that tires, for example, can be mounted on the rim without interference or possible laceration from an edge fin 4,5, projection, or other protuberance remaining on the rim after fabrication and finishing. Furthermore, a clean surface must be ensured in the tire seating area on the inner side of the rim, to guarantee that tubeless tires can be mounted tightly to the rim. Depending on requirements, the remaining projection can remain in place on the inside of the rim.

Figure 3:
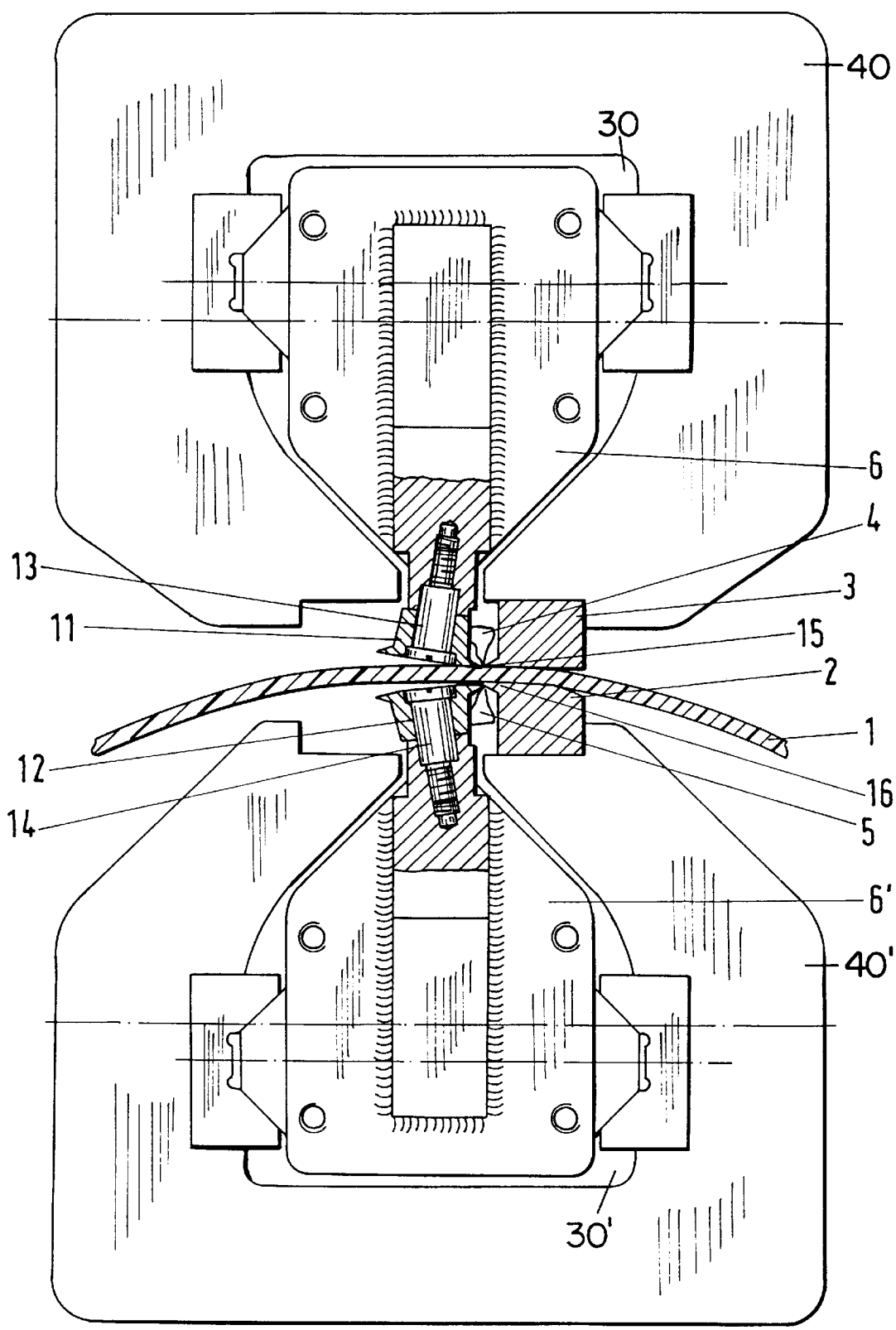
FIG. 3 is an alternative embodiment of the apparatus of FIG. 1.

Referring next to FIG. 3, a second embodiment of the apparatus according to the present invention is shown. In contrast to the embodiment in FIG. 1, roll blades 11, 12 are attached to the movable tool carriers 6, 6', respectively. The axes 13, 14 of the roll blades 11, 12 are slanted relative to the axis of the tool carriers 6, 6' thereby creating an empty space on the side facing away from the edge fin 4, 5, which ensures an unobstructed rolling-off movement of the roll blades 11, 12. Like the stationary blades, the cutting area of the roll blades 11, 12 are wedge-shaped in cross-section. To support the lateral incision in the edge fin, the clamping jaws 2, 3 have a nose 15, 16 with a wedge-shaped cross-section on the side facing toward the edge fin 4, 5.

The invention is not limited by the embodiments described above which are presented as examples only but can be modified in various ways within the scope of protection defined by the appended patent claims.

We claim:

1. An apparatus for removing an edge fin formed during production of a workpiece on a workpiece surface, the workpiece defining a longitudinal direction, said apparatus comprising:

means for cutting a lateral incision into the edge fin in the longitudinal direction above the workpiece surface, said cutting means including a tool carrier mounted in a frame for movement within and along the frame in the longitudinal direction of the workpiece, said tool carrier carrying a tool comprising a cutting blade having a cutting edge slanted relative to the longitudinal direction of the edge fin and a wedge-shaped cross-section vertical to the longitudinal direction of the edge fin; and means for clamping the workpiece along the longitudinal direction of the workpiece, said clamping means including a clamping device attached to the frame for securing said workpiece in position for removal of the edge fin.

2. The apparatus of claim 1, wherein said cutting blade is a roll blade.

3. The apparatus of claim 2, further comprising clamping jaws attached to the frame and having a nose portion shaped for supporting the edge fin during longitudinal movement of said tool.

4. An apparatus for removing an edge fin from a workpiece defining a longitudinal direction and having a first and a second surface, the apparatus including a tool carrier mounted in a frame for movement within and along the frame in the longitudinal direction of the workpiece, said apparatus comprising:

two cutting blades mounted in the tool carrier, one of said cutting blades being arranged near the first surface of the workpiece and the other of said cutting blades being arranged near the second surface of the workpiece, each of said cutting blades having a cutting edge slanted relative to the longitudinal direction of the workpiece and being substantially wedge-shaped in cross-section when viewed perpendicular to the longitudinal direction, each of said cutting blades being configured for cutting a lateral incision into the edge fin in the longitudinal direction of the workpiece above the workpiece first and second surfaces; and a clamping device secured to the frame and configured for clamping the workpiece in the longitudinal direction of the workpiece during the cutting of said lateral incision.

5. The apparatus of claim 4, wherein each of said cutting blades is a roll blade.

6. The apparatus of claim 4, wherein said clamping device further comprise a nose portion shaped for supporting the edge fin during movement of said cutting blades in the longitudinal direction.

* * * * *